Oct. 18, 1960 F. W. HOTTENROTH, JR 2,956,397
REMOTELY ADJUSTED THERMOSTATIC MEANS
Filed May 26, 1954 2 Sheets-Sheet 1

INVENTOR.
FREDERICK W. HOTTENROTH, JR.

BY

ATTORNEYS

Oct. 18, 1960 F. W. HOTTENROTH, JR 2,956,397
REMOTELY ADJUSTED THERMOSTATIC MEANS
Filed May 26, 1954 2 Sheets-Sheet 2

INVENTOR.
FREDERICK W. HOTTENROTH, JR.
BY
ATTORNEYS

United States Patent Office 2,956,397
Patented Oct. 18, 1960

2,956,397

REMOTELY ADJUSTED THERMOSTATIC MEANS

Frederick W. Hottenroth, Jr., Newton, Mass., assignor to Standard-Thomson Corporation, Boston, Mass., a corporation of Delaware Filed May 26, 1954, Ser. No. 432,484

12 Claims. (Cl. 60—23)

The present invention relates to means for remote adjustment of a thermostat. More particularly, it relates to a device for remote adjustment by transmission of electric energy at a controlled rate to a heating element in proximity with the sensitive element of the thermostat. The said device, according to this invention, is capable of adjustment in such a manner as to produce the same response as an equivalent adjustment in the temperature setting of the thermostat.

The principal object of this invention is to provide means for adjustment of a thermostat setting remotely from the thermostat. This arrangement is desirable in a great many applications, for example in the air circulating and conditioning controls of shipboard or railroad passenger compartments, roomettes and other individually regulated facilities, and in automotive vehicles. In these and other installations it may happen that the optimum location of the thermostat is remote from or not conveniently accessible to the occupant, whereby it becomes necessary or desirable to adjust the thermostat remotely. Thus, in an automobile it may be most advantageous to locate the thermostat in the rear of the passenger compartment (e.g. behind the rear seat) where it is inaccessible to the driver.

The thermostat itself may or may not be located remotely from the means to be ultimately controlled thereby. Thus, it may be in close proximity to a switch, valve, or other means constituting the control element of the air conditioning system; or it may be situated in a space which is remote from the control element, as well as from the adjustment means.

Heretofore, a number of proposals have been made for remote manual, hydraulic, or electrical adjustment of a thermostat. Generally, the electrical forms are preferred because the wires connecting the adjustment means and thermostat are less bulky, cheaper and easy to manage. But the electrical forms are generally sensitive to changes in the available voltage supply. Thus, a drop of a few volts may radically affect the response of the remote adjustment means, thereby effecting a change in the response of the thermostat when none was intended. Also, the calibration of the adjustment device may be subject to change as a function of temperature. It is therefore a further object of this invention to provide an adjustment device that is not sensitive to voltage variations.

A still further object is to provide a device having a rapid response, whereby there is negligible delay in tarnslating a given change in the adjustment setting into a corresponding adjustment of the thermostat response.

With these and other objects in view the features of this invention reside in the use of a heater element in the thermostat and an electrical thermal timer device remote therefrom having means for adjustment, whereby the rate of energy transmission to the heater element is a function of the adjustment setting unaffected by variations in the ambient temperature at the location of the timer.

As heretofore indicated, it is immaterial to this invention whether the device to be actuated by the thermostat is remote from it, this being a matter of design and convenience for the particular purpose intended.

Other features of the invention relate to certain features of construction, modes of operation, structures, controls, and arrangements which will be more clearly understood with reference to the following description thereof, and to the appended drawings in which.

Figure 1:
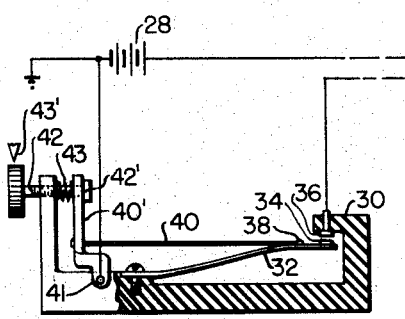
Fig. 1 shows the preferred embodiment utilizing a hot wire timer.
Figure 1:
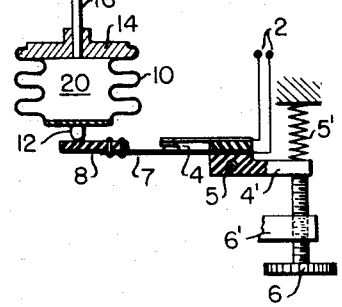

Referring to Fig. 1, I show a pair of terminals 2 which may be connected through contacts 4, the latter being insulatedly supported by an arm 4' pivoted about a fixed pin 5. The contacts 4 represent the control element in an air conditioning system of any suitable type, either in a vehicle or a stationary installation. The arm 4' is urged clockwise by a spring 5' against a screw 6 threaded on a fixed frame 6'. The movable blade 7 is suitably attached to an extension 8 of insulating material. A metallic bellows 10 having a closed end has soldered thereto a short pin 12 in position to bear upon the extension 8. The bellows is soldered at one end to a fixed fitting 14 having a threaded center bore adapted to receive a capillary tube 16. The tube 16 is connected to a thermostat bulb 18 situated in the space to be controlled. The bulb, tube and bellows are entirely filled with a suitable fluid 20 having the property of expanding volumetrically upon an increase in temperature. Temperature adjustment may take any suitable form, but as here illustrated it is provided by the threaded screw 6. The fitting 14, as stated, is assumed fixed, whereby expansion of the fluid results in downward extension of the bellows and consequent opening of the contacts 4.

It will be understood that the capillary tube 16 may or may not be of extended length depending upon whether the contacts 4 are remote from the space to be controlled.

Figure 3:
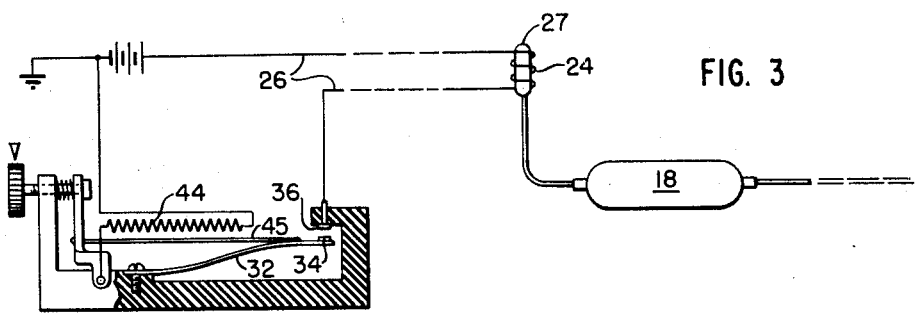
Fig. 3 shows a second alternative embodiment in which the extensible wire is heated by a resistance in series with it.

A heater coil 24 surrounds a portion of the bulb and is connected by two wires 26 with the remote adjustment device. Alternatively, the heater may be placed in heat exchange relation with a separate, small thermal bulb 27 forming a part of the same liquid system as the main thermostatic bulb 18, as shown in Fig. 3.

The thermal fluid thermostat system just described is intended as illustrative only, and may be replaced by any other suitable thermostatic control system. In any case, the heater 24 is located in heat exchange relation with a thermally sensitive element in the system, illustrated in this instance by the bulb 18.

The remote adjustment device is powered by a battery 28 or a suitable source of alternating current, and comprises a thermal timer similar to the familiar hot wire type which has been used for many years in numerous applications, for example as overload protection. In the illustrated form, the timer includes a base portion 30 of insulating material to which is secured a flat metal strip 32 at one end thereof, the strip having at the other end a suitable contact point 34 bearing upon a small contact plate 36 secured to the base. Near the contact 34 the strip 32 has a hook portion 38 to which is secured one end of a tensioned resistance wire 40. The other end of the wire is secured to an arm 40' pivoted at 41 to the base 30. An adjustment screw 42 threaded in the base 30 and having a head 42' permits adjustment of the tension of the wire 40. A spring 43 holds the arm 40' firmly against the head 42′ at all times. The wire 40 has both appreciable resistivity and an appreciable thermal expansion coefficient. The wire and strip are chosen to have the same thermal expansion coefficient. When the wire is at the same temperature as the strip, its tension is normally adjusted so as to close the contacts. A fixed pointer 43′ is provided adjacent a scale on the knob of the screw 42, conveniently calibrated in degrees of temperature rise, as will be explained below.

The operation of the above-described device may be summarized as follows. If the contacts 34, 36 are closed, current flows through the wire 40, and because of its resistance the wire heats up and elongates. Eventually, the wire allows the metal strip 32 to open the contacts. With the stoppage of current the wire cools through heat dissipation. When the contacts again close the wire again heats up and the cycle is repeated. The response is extremely rapid, with the cycle of opening and closing of the contacts occurring many times per second. Thus, an equilibrium thermal vibratory condition is reached, wherein the temperature of the wire oscillates closely about an average value approximately equal to that at which its length barely allows the contacts to close. In this condition, the average power generated by the current in the wire becomes equal to the average rate of heat dissipation therefrom to the surroundings, and is measured by the product of the resistance of the wire and the square of the current, multiplied by the ratio of the time during which the contacts are closed to the total time.

Since the coil 24 on the remotely-located thermostatic bulb 18 is in series with the wire 40, the average power developed in the coil is proportional to that developed in the wire. The temperature of the bulb also increases, until it reaches an equilibrium level above the ambient temperature at the thermostat, at which level the average rate of heat dissipation to the surroundings equals the average rate of heat development due to current in the coil. The result is to cause the bulb 18 to "interpret" the ambient temperature at the bulb as being a certain definite number of degrees higher than it actually is.

It will be readily understood that for every adjustment in tension of the wire 40 by turning the screw 42, a corresponding average power is developed in the coil 24, and hence a definite corresponding rise in the temperature of the bulb 18 over the prevailing ambient temperature is produced. Increasing the tension in the wire 40 increases the difference or rise between the bulb temperature and ambient temperature at the bulb.

Moreover, since the wire and strip have the same temperature coefficient of expansion, any increase in the ambient temperature at the timer, and hence in the length of the strip (which is substantially affected only by ambient temperature), correspondingly increases the length, and hence the temperature, to which the wire must attain to barely close the contacts. The arrangement is such that this increase in the minimum temperature of the wire at which the contacts barely close is substantially equal to the increase in local ambient temperature that produces it. Thus, the device has the additional property that for any particular adjustment the equilibrium or average temperature of the wire is a substantially fixed number of degrees above the ambient temperature at the timer, and a fixed average power is developed in the coil 24, irrespective of wide variations in this ambient temperature. The effect of ambient temperature at the timer is therefore substantially eliminated. The net response of the device is determined only by the ambient temperature at the bulb 18, plus a fixed number of degrees determined by the remote adjustment of the screw 42 on the timer.

It will be apparent from the above that it is equally possible either to over-compensate or under-compensate for the effects of temperature at the timer, if desired.

The screw 42 is provided with an indicator pointer 43′ and scale, calibrated preferably in degrees of temperature above that determined by the setting of the screw 6. The latter is preferably set to produce a temperature several degrees lower than the optimum temperature, and the timer screw 42 is then set to adjust for the difference. In this manner, adjustments both above and below the optimum setting may be accomplished from the remote position.

It will be observed that the operation of the timer is unaffected by changes in the voltage supply 28, for although the consequent changes in the current will tend to affect the time necessary to raise the temperature of the wire to a given value, the average rate of energy delivered to the heater coil 24 is unaffected. In other words, if the voltage decreases, the current decreases also, but the contacts remain closed longer in each cycle of vibration. Conversely, if the voltage increases, the current increases but the contacts do not remain closed as long in each cycle of vibration. It has been found that very considerable changes in voltage result in little or no appreciable change in the over-all thermostatic response.

The peculiar advantages of using a hot wire timer in the described arrangement include its unexpectedly great sensitivity as reflected in a high frequency of opening and closing of the contacts 34, 36. Thus, while the current flowing in the leads 26 is intermittent, the rate of development of heat in the coil 24 is relatively smooth. In fact, an ammeter inserted in one of the leads 26 does not fluctuate visibly when the system is in equilibrium, but reads a steady value equal to the average current. When the adjustment of the screw 42 is changed, the meter changes smoothly and rapidly to a steady higher or lower reading corresponding to the adjustment.

Figure 4:
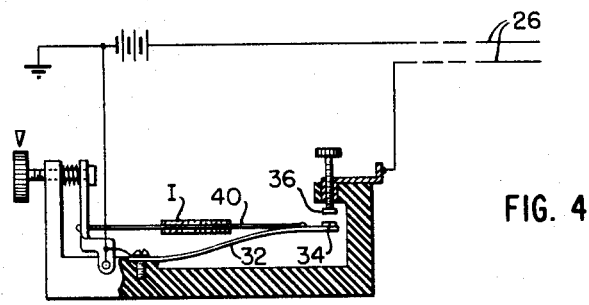
Fig. 4 shows a third alternative embodiment in which other variations in the design are illustrated.

In Fig. 1 I have illustrated a form of hot wire timer in which the wire has appreciable resistivity and acts as a self-heater. As shown in Fig. 3, I may alternatively employ a separate heater 44 in series with the wire 45 and in heat exchange relation with it, in which case the wire need not have appreciable resistivity. As shown in Fig. 4, I may also connect the wire and the strip 32 electrically in parallel so that the current is divided between them. I may also insulate the wire as shown at I to reduce heat conduction and radiation, thus reducing the influence of these factors upon the characteristics of the timer. Instead of, or in addition to, adjusting the tension of the wire 40, I may provide means to raise or lower the stationary contact plate 36 as a means of adjustment, as shown in Fig. 4. In any event, the compensation for ambient temperature effects must take due account of any modifications of the timer that significantly affect its response.

Figure 2:
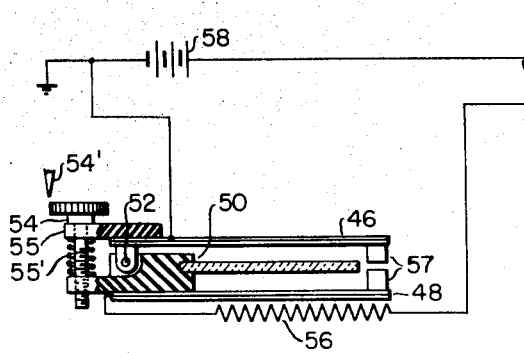
Fig. 2 shows an alternative bimetallic strip timer suitable for use in practising the invention.

In Figure 2, I show an alternative form of timer compensated for ambient temperature and utilizing a pair of bimetallic strips 46 and 48. These strips are insulated both electrically and thermally by a separator 50, the strip 48 being secured at one end thereto and the strip 46 being pivoted at 52 therein. The adjustment is provided by a screw 54 having a scale and pointer 54′ and bearing upon an insulating extension 55 of the strip 46. A spring 55′ holds the extension 55 firmly against the base of the screw at all times. Both strips are subject to ambient temperature variations and are arranged to bend the same way in response to a change therein. The lower strip 48 is in heat exchange relation with a heater element 56 which is in series with the contacts 57. The contacts and the heater 56 are connected in series with a battery 58 or other suitable voltage source, and the entire series circuit is connected by the wires 26 with the main thermostat as in the previously—described embodiment.

As has been previously stated, the described embodiments are merely illustrative of the invention, and are susceptible of numerous modifications, rearrangements and changes in design, mode of operation, and, structure which are above suggested or will suggest themselves to those skilled in this art after a study of this specification. It is understood and believed that such modifications and changes in the said embodiments may be accomplished as the requirements of particular applications may demand without departing from the spirit or scope of the invention.

Having thus described the invention, I claim:

1. In thermostatically controlled apparatus, the combination of a control device, a temperature sensitive element to actuate the device, a heater adjacent said element, a source of current, an adjustable thermal timer remote from said sensitive element, and a circuit connecting said heater, source and timer in series, said timer having a resistance element and a pair of contacts in series in said circuit and having provision to open said contacts in response to heat generated by current passing through said resistance element, said timer further having means to adjust the opening of the contacts to control the average rates of heat dissipation in said resistance element and heater.

2. In thermostatically controlled apparatus, the combination of a fluid actuated control device, a thermal fluid system to actuate said device including a thermostatic bulb, a heater adjacent the bulb, a source of current, a thermal timer remote from the bulb, and a circuit connecting said heater, source and timer in series, said timer having a resistance element and a pair of contacts in series in said circuit and having provisions to open said contacts in response to heat generated by current passing through said resistance element, said timer further having means to adjust the opening of the contacts to control the average rates of heat dissipation in said resistance element and heater.

3. In thermostatically controlled apparatus, the combination of a control device, a temperature sensitive element to actuate the device, a heater adjacent said element, a source of current, an adjustable thermal timer remote from said sensitive element, and a circuit connecting said heater, source and timer in series, said timer having a resistance in series with said contacts in said circuit and being adapted to open the contacts upon an increase of temperature, said timer further having means to adjust the opening of the contacts to control the average rates of heat dissipation in said resistance and heater.

4. In thermostatically controlled apparatus, the combination of a control device, a temperature sensitive element to actuate the device, a heater adjacent said element, a source of current, an adjustable thermal timer remote from said sensitive element, and a circuit connecting said heater, source and timer in series, said timer having a stationary contact, a movable contact, a spring tending to open the contacts, and a thermally extensible tension wire tending to close the contacts, a portion of said timer in said circuit being resistive and including said contacts, said timer further having means to adjust the opening of the contacts to control the average rates of heat dissipation in said resistance and heater.

5. In thermostatically controlled apparatus, the combination of a control device, a temperature sensitive element to actuate the device, a heater adjacent said element, a source of current, an adjustable thermal timer remote from said sensitive element, and a circuit connecting said heater, source and timer in series, said timer having a pair of bimetallic strips each having a contact and being adapted to deflect equally in response to a change in ambient temperature to substantially eliminate the effect thereof on the opening of said contacts and a resistance element in series with said contacts in said circuit and having closer heat exchange relation to one of said strips than to the other, whereby heat from the resistance tends to open the contacts, said timer further having means to adjust the opening of the contacts to control the average rates of heat dissipation in said resistance and heater.

6. In thermostatically controlled apparatus, the combination of a control device, a temperature sensitive element to actuate the device, a heater adjacent said element, a source of current, an adjustable thermal timer remote from said sensitive element, and a circuit connecting said heater, source and timer in series, said timer having a pair of contacts, a first thermally displaceable member adapted to move the contacts toward an open position upon an increase in the temperature of said first thermally displaceable member and a second thermally displaceable member adapted to move the contacts toward a closed position upon an increase in temperature of said second thermally displaceable member, whereby the relationship of the contacts remains substantially constant with a change in the ambient temperature, a portion of said timer in said circuit being resistive and including said contacts, the resistive portion having closer heat exchange relation to said first thermally displaceable member than to said second thermally displaceable member, whereby heat from the resistive portion tends to open the contacts, said timer further having means to adjust the opening of the contacts to control the average rates of heat dissipation in said resistance and heater.

7. Apparatus according to claim 4, in which the resistive portion is in closer heat exchange relation to the wire than to the spring.

8. Apparatus according to claim 4, in which a length of the wire is connected in series in said circuit, said length of wire constituting a resistance which dissipates heat in the timer.

9. In thermostatically controlled apparatus, the combination of a control device, a temperature sensitive element to actuate the device, a heater adjacent said element, a source of current, an adjustable thermal timer remote from said sensitive element, and a circuit connecting said heater, source and timer in series, said timer having a base, a first contact mounted on the base, a second contact movable in relation to the first contact, a spring supported on the base and tending to open the contacts, a member pivotally supported on the base, and a thermally extensible tension wire secured between said member and said spring and tending to close the contacts, a portion of said timer in said circuit being resistive and including said contacts, and means to adjust said member pivotally in relation to the base to vary the tension on said wire and thereby to control the average rates of heat dissipation in said resistive portion and heater.

10. Apparatus according to claim 9, in which the resistive portion is in closer heat exchange relation to the wire than to the spring.

11. Apparatus according to claim 9, in which the spring is a thermally extensible member adapted to move the contacts toward an open position upon an increase in temperature, whereby the relationship of the contacts remains substantially constant with a change in the ambient temperature.

12. Apparatus according to claim 9, in which a length of the wire is connected in series in said circuit, said length of wire constituting a resistance which dissipates heat in the timer.

References Cited in the file of this patent

UNITED STATES PATENTS

| | | |
|---|---|---|
| Re. 16,892 | Ruckelshaus | Feb. 28, 1928 |
| 739,967 | Wohl et al. | Sept. 29, 1903 |
| 1,217,715 | Crane | Feb. 27, 1917 |
| 2,237,248 | Denison | Apr. 1, 1941 |
| 2,353,350 | Millerwise | July 11, 1950 |
| 2,581,942 | Collins et al. | Jan. 8, 1952 |
| 2,592,834 | Tiffany | Apr. 15, 1952 |